3,634,504
ALPHA-MONOCHLORINATION OF
CARBOXYLIC ACIDS
Arnold E. Young, Midland, Mich., assignor to The Dow
Chemical Company, Midland, Mich.
No Drawing. Filed Aug. 9, 1968, Ser. No. 751,343
Int. Cl. C07c 53/16, 61/02, 63/10
U.S. Cl. 260—539 R                              7 Claims

ABSTRACT OF THE DISCLOSURE

Carboxylic acids having at least one hydrogen atom attached to a carbon atom that is alpha to the carboxy group are chlorinated to give their alpha-monochlorinated derivatives by a process comprising contacting them with chlorine at a temperature between 75 and 225° C. while in the presence of a catalytic amount of trichloroacetyl chloride, trichloroacetic anhydride, trifluoroacetyl chloride or trifluoroacetic anhydride.

BACKGROUND OF THE INVENTION

The classical Hell-Volhard-Zelinsky (H–V–Z) reaction involves the alpha-halogenation of aliphatic carboxylic acids by contacting them with bromine or chlorine in the presence of a catalytic amount of phosphorus.

It is known that improved yields of alpha-monochloroaliphatic carboxylic acids are obtained by conducting the standard H–V–Z reaction in the presence of a trace amount of an acyl halide, preferably one that corresponds to the acid being chlorinated. See Bass, U.S. Pat. No. 2,010,685. Bass also discloses a number of inorganic halides, oxides and oxyhalides that are effective as H–V–Z catalysts.

It is also known that monochloroisobutyric acid is obtained by contacting isobutyric acid with chlorine in the presence of a catalytic amount of isobutyric anhydride or isobutyryl chloride. See Loder et al., U.S. Pat. No. 2,043,670.

SUMMARY OF THE INVENTION

It has now been found that carboxylic acids having at least one hydrogen atom attached to a carbon atom that is alpha to the carboxy group are alpha-monochlorinated by a process comprising contacting them while in liquid form with chlorine while in the presence of a catalytic amount of trichloroacetyl chloride, trichloroacetic anhydride, trifluoroacetyl chloride or trifluoroacetic anhydride. By conducting the alpha-chlorination reaction in the above manner, higher conversions of the acid starting material and better yields of the desired alpha-monochlorinated product than have heretofore been possible are achieved.

In order to practice the invention, a carboxylic acid having at least one hydrogen atom attached to a carbon atom that is alpha to the carboxy group is reacted by contact, in any convenient manner, with chlorine while in the presence of a catalytic amount of trichloroacetyl chloride, trichloroacetic anhydride, trifluoroacetyl chloride or trifluoroacetic anhydride. After reaction, the desired alpha-monochlorinated product is separated from the reaction mixture in any convenient manner, e.g. by fractional distillation.

Specific examples of the acid starting materials are those carboxylic acids having the formula

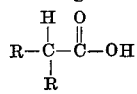

where each R independently is H, alkyl having up to about sixteen carbon atoms (preferably alkyl having up to ten carbon atoms), aryl having up to ten carbon atoms (preferably phenyl) or aralkyl having up to ten carbon atoms (preferably aralkyl having up to eight carbon atoms) and both R's, taken together, may combine with the carbon atoms to which they are attached to form a cycloalkane ring having up to eight carbon atoms (preferably cyclohexane). Thus, typical acids that are alpha-monochlorinated by the practice of this invention include acetic; the monoalkyl-substituted acetic acids such as propionic, butyric, valeric, hexanoic, caprylic, lauric, myristic, palmitic, stearic, isovaleric, isohexanoic and the like; the dialkyl-substituted acetic acids such as 2-methylpropionic, 2-methylbutyric, 2-methylhexanoic, 2-methyllauric, 2-propylvaleric and the like; the monoaryl-substituted acetic acids such as phenylacetic, 1-naphthylacetic and the like; the alkyl and aryl-substituted acetic acids such as α-methylphenylacetic, α-ethyl-1-naphthylacetic and the like; the monoaralkyl-substituted acetic acids such as γ-phenylbutyric, 6-phenylhexanoic and the like; the diaralkyl-substituted acetic acids such as diphenethylacetic and the like; the diaryl-substituted acetic acids such as diphenylacetic and the like; the aryl aralkyl substituted acetic acids such as α-(2-phenethyl) phenylacetic and the like; the aralkyl and alkyl substituted acetic acids such as α-phenylbutyric and the like; and the cycloalkane carboxylic acids such as cyclohexane carboxylic acid.

In general, it is preferred to react the carboxylic acid and chlorine in about an equimolar ratio, e.g. between 2:1 and 1:2, but the ratio of reactants can vary widely and their ratio is not critical to this invention. The process of this invention is operable over a wide temperature range, i.e. between 75 and 225° C., but it is preferred to conduct the reaction at a temperature between 125 and 175° C. Addition of a catalytic amount of trichloroacetyl chloride, trichloroacetic anhydride, trifluoroacetyl chloride or trifluoroacetic anhydride gives increased yields of the desired alpha-monochloro derivatives of the previously described acids, e.g. an amount between 0.1 and 20 mole percent, based on the acid to be chlorinated will normally suffice. Preferably, the amount is between 0.5 and 15% and most preferably between 1 and 10%.

DESCRIPTION OF SPECIFIC EMBODIMENT

Each of the following runs was made in a 45 by 200 mm. vertical tubular reactor equipped with a chlorine inlet through the bottom of the reactor and extending thereinto which comprised a sintered glass stick, a mechanical stirrer, a water condenser and a Dry Ice condenser. The reactor vessel was painted black and the remaining glass surfaces were covered with aluminum foil to exclude light. Heat for the reactions was supplied by a standard 250 W infra-red lamp. The alpha-chlorination procedure was as follows; the reactor was charged with the acid to be chlorinated containing a catalytic amount of one of trichloroacetyl chloride, trichloroacetic anhydried, trifluoroacetyl chloride or trifluoroacetic anhydride. After raising the temperature to the desired level, chlorine was then introduced into the liquid mixture through the sintered glass stick. Upon completion of the chlorine addition, nitrogen was bubbled through the reaction mixture and when the temperature had fallen to 120° C., 1 ml. of $H_2O$ was added to hydrolyze any acyl halide or anhydride that was present.

The product acids were analyzed by vapor phase chromatography after converting them to their methyl esters using a 2 molar solution of $BF_3$ in $CH_3OH$. In comparative runs, $PCl_3$ or hexanoyl chloride was used instead of trichloroacetyl chloride and the like.

The results of a series of runs using 0.6 mole of hexanoic acid and 0.7 mole of chlorine in the presence of trichloroacetyl chloride are shown in Table I. A comparative run using a standard H–V–Z catalyst, $PCl_3$, is shown. The percent conversion is based on moles of hexanoic acid charged and the yield percent is mole percent of alpha-chlorohexanoic acid based on the converted material in the product mixture.

TABLE I

| Run No. | Temp., °C. | Acid chloride | Moles | Chlorine addition time, hrs. | Conv., percent | Yield, percent |
|---|---|---|---|---|---|---|
| 1 | 125 | CCl₃COCl | 0.06 | 3.9 | 94 | 85 |
| 2 | 150 | Same as above | 0.06 | 3.7 | 95 | 87 |
| 3 | 175 | ...do | 0.06 | 3.6 | 99 | 85 |
| 4 | 125 | PCl₃ | 0.012 | 4.5 | 85 | 52 |
| 5 | 175 | PCl₃ | 0.012 | 3.5 | 87 | 85 |
| 6 | 175 | Hexanoyl chloride | 0.03 | 3.7 | 77 | 63 |

In similar experiments using acid anhydrides with hexanoic anhydride as a comparative run, the results were as follows:

TABLE II

| Run No. | Temp., °C. | Anhydride | Moles | Hexanoic acid, moles | Chlorine addition time, hrs. | Conv., percent | Yield, percent |
|---|---|---|---|---|---|---|---|
| 7 | 125 | (CCl₃CO)₂O | 0.06 | 0.6 | 3.8 | 95 | 87 |
| 8 | 175 | same | 0.06 | 0.6 | 3.7 | 88 | 95 |
| 9 | 175 | (CF₃CO)₂O | 0.06 | 0.6 | 3.8 | 81 | 84 |
| 10 | 175 | (CH₃(CH₂)₄CO)₂ | 09054 | 0.054 | 4.3 | 67 | 71 |

In a similar series of runs, the monoalpha-chlorination of 0.4 mole of lauric acid with 0.45 mole of chlorine gave the following results. PCl₃ was used as a comparative catalyst.

TABLE III

| Run No. | Temp., °C. | Catalyst | Moles | Chlorine addition time, hrs. | Conv., percent | Yield, percent |
|---|---|---|---|---|---|---|
| 11 | 150 | CCl₃COCl | 0.04 | 2.7 | 80 | 77 |
| 12 | 150 | Same as above | 0.06 | 2.7 | 78 | 85 |
| 13 | 175 | PCl₃ | 0.04 | 2.5 | 61 | 46 |
| 14 | 150 | PCl₃ | 0.04 | 3.0 | 61 | 41 |

I claim:
1. A process for making the alpha-monochlorinated derivative of a carboxylic acid that has at least one hydrogen atom attached to the carbon atom next to the carboxy group which comprises reacting by contacting the acid with chlorine at reaction temperature while in the presence of a catalytic amount of trichloroacetyl chloride, trichloroacetic anhydride, trifluoroacetyl chloride or trifluoroacetic anhydride.
2. A process as defined in claim 1 wherein the acid has the formula

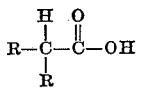

where each R independently is H, alkyl having up to sixteen carbon atoms, aryl having up to ten carbon atoms or aralkyl having up to ten carbon atoms and where both R's, taken together with the carbon atom to which they are attached, may form a cycloalkane ring having up to eight carbon atoms.
3. A process as defined in claim 2 wherein one R is H and the other R is alkyl having up to ten carbon atoms.

4. A process as defined in claim 1 wherein the catalytic amount is between 0.1 and 20 mole percent, based on the acid to be chlorinated.

5. A process as defined in claim 1 wherein the temperature is between 75 and 225° C. and the catalytic amount is between 0.5 and 15 mole percent, based on the acid to be chlorinated.

6. A process as defined in claim 1 wherein the catalyst is trichloroacetyl chloride.

7. A process as defined in claim 1 wherein the acid is hexanoic, the temperature is between 125 and 175° C., the molar ratio of hexanoic acid to chlorine is between 2:1 and 1:2 and the reaction occurs in the presence of between 1 and 10 mole percent of trichloroacetyl chloride, based on hexanoic acid.

References Cited
UNITED STATES PATENTS

| | | | |
|---|---|---|---|
| 2,826,610 | 3/1958 | Morris | 260—539 A |
| 2,043,670 | 6/1936 | Loder et al. | 260—539 |
| 1,993,713 | 3/1935 | Bass et al. | 260—539 |
| 2,674,620 | 4/1954 | Sania et al. | 260—539 A |
| 2,539,238 | 1/1951 | Eaker | 260—539 A |

LEWIS GOTTS, Primary Examiner

J. L. DAVISON, Assistant Examiner

U.S. Cl. X.R.

260—408, 514, 515 A, 539 A